(12) United States Patent
Cunningham et al.

(10) Patent No.: US 9,442,314 B2
(45) Date of Patent: Sep. 13, 2016

(54) FERROELECTRIC-ENHANCED TUNING OF RING RESONATORS BY USING FIELDS PARALLEL TO AND ABOVE A TOP SURFACE THEREOF

(71) Applicant: Oracle International Corporation, Redwood City, CA (US)

(72) Inventors: John E. Cunningham, San Diego, CA (US); Xuezhe Zheng, San Diego, CA (US); Ashok V. Krishnamoorthy, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 38 days.

(21) Appl. No.: 14/457,925

(22) Filed: Aug. 12, 2014

(65) Prior Publication Data

US 2016/0048041 A1 Feb. 18, 2016

(51) Int. Cl.
*G02F 1/225* (2006.01)
*G02F 1/025* (2006.01)
*G02F 1/05* (2006.01)
*G02B 6/12* (2006.01)

(52) U.S. Cl.
CPC ............. *G02F 1/025* (2013.01); *G02F 1/0508* (2013.01); *G02F 1/225* (2013.01); *G02B 2006/12047* (2013.01); *G02B 2006/12061* (2013.01)

(58) Field of Classification Search
None
See application file for complete search history.

(56) References Cited

U.S. PATENT DOCUMENTS

| 6,993,212 | B2 * | 1/2006 | Block | G02F 1/011 385/3 |
| 7,346,248 | B2 * | 3/2008 | Atwater | G02F 1/03 385/122 |
| 7,783,144 | B2 * | 8/2010 | Chigrinov | G02B 6/12007 385/15 |
| 7,894,696 | B2 * | 2/2011 | Baehr-Jones | B82Y 20/00 385/1 |
| 7,961,988 | B2 * | 6/2011 | Krug | G02B 6/12007 385/1 |
| 8,009,937 | B2 * | 8/2011 | Mathai | G02B 6/12007 257/431 |
| 8,300,990 | B2 * | 10/2012 | Li | G02B 6/12002 359/245 |
| 8,428,404 | B1 * | 4/2013 | Shubin | G02B 6/12004 385/1 |
| 8,891,922 | B2 * | 11/2014 | Krug | G02B 6/12007 385/50 |
| 8,983,238 | B2 * | 3/2015 | Bratkovski | G02B 6/12007 385/131 |

(Continued)

*Primary Examiner* — Andrew Jordan
(74) *Attorney, Agent, or Firm* — Park, Vaughan, Fleming & Dowler LLP

(57) ABSTRACT

An integrated circuit is described. This integrated circuit includes a ferroelectric layer disposed on top of the ring resonator, which has a resonance wavelength. The ferroelectric layer is positioned between electrical contacts. Moreover, there may be amorphous semiconductor materials between the electrical contacts and the ferroelectric layer. For example, the amorphous semiconductor materials may include: p-type amorphous silicon and/or n-type amorphous silicon. By applying a reverse-bias voltage across the electrical contacts, an electric field is generated in a plane approximately parallel to a top surface of the ring resonator. This electric field electro-optically tunes the resonance wavelength. The ring resonator may operate at low voltage and can be integrated with a silicon optical waveguide on a silicon-on-insulator (SOI) platform.

18 Claims, 5 Drawing Sheets

(56) References Cited

U.S. PATENT DOCUMENTS

| | | | | |
|---|---|---|---|---|
| 2005/0054199 A1* | 3/2005 | Block | G02F 1/011 | 438/689 |
| 2007/0258677 A1* | 11/2007 | Chigrinov | G02B 6/12007 | 385/15 |
| 2008/0193133 A1* | 8/2008 | Krug | G02B 6/12007 | 398/83 |
| 2009/0067773 A1* | 3/2009 | Krug | G02B 6/12007 | 385/9 |
| 2009/0245714 A1* | 10/2009 | Bratkovski | G02B 6/12007 | 385/2 |
| 2009/0263076 A1* | 10/2009 | Mathai | G02B 6/12007 | 385/14 |
| 2010/0134215 A1* | 6/2010 | Lee | H01P 7/082 | 333/235 |
| 2011/0002578 A1* | 1/2011 | Nakada | G02B 6/12007 | 385/9 |
| 2013/0087890 A1* | 4/2013 | Mi | B82Y 10/00 | 257/618 |
| 2013/0301981 A1* | 11/2013 | Li | G02B 6/136 | 385/14 |
| 2016/0048041 A1* | 2/2016 | Cunningham | G02F 1/0508 | 385/2 |

* cited by examiner

FERROELECTRIC-ENHANCED TUNING OF RING RESONATORS BY USING FIELDS PARALLEL TO AND ABOVE A TOP SURFACE THEREOF

GOVERNMENT LICENSE RIGHTS

This invention was made with U.S. government support under Agreement No. HR0011-08-9-0001 awarded by DARPA. The United States government has certain rights in the invention.

BACKGROUND

1. Field

The present disclosure relates to techniques for modulating optical signals. More specifically, the present disclosure relates to an integrated optical device that includes a low-voltage ring resonator that includes a ferroelectric layer.

2. Related Art

Silicon photonics is a promising technology that can provide large communication bandwidth, low latency and low power consumption for inter-chip and intra-chip optical interconnects or links. Key components for use in inter-chip and intra-chip optical interconnects are modulators, filters and wavelength-division-multiplexing (WDM) components that can be integrated in the same silicon layer as other optical components and transistors.

Silicon-photonic ring resonators can operate at infrared wavelengths that include a 1.5 μm band, which makes them suitable for use as modulators and filters. In multi-wavelength applications, such ring resonators are modulators but they also serve as multiplexers and de-multiplexers to enable signaling on different wavelength channels for dense WDM links. Moreover, the silicon ring resonators can be fabricated using CMOS-compatible silicon-on-insulator (SOI) technology that confines the optical mode in a compact footprint so that bending losses are low enough to support a high density of interconnects on a chip. These high-density ring resonators can be fabricated in typical, narrow linewidth nodes at CMOS foundries, thereby offering the advantages of high volume and low cost.

However, as with transistors, silicon ring resonators are subject to manufacturing variations. While the impact of manufacturing variations on electrical components is typically within the noise margins, for optical applications these manufacturing variations can pose a more serious challenge. In particular, manufacturing variations in the fabrication of ring resonators include variations in: the etch depth, the etch width and the thickness of the silicon layer above the buried-oxide layer that geometrically defines a ring resonator. These variations result in different effective indexes of refraction for ring resonators, which in turn changes the group velocity of the light that transverses the ring resonators. The main impact of such changes is to shift the resonant wavelength of the ring resonators away from their intended target values in an unpredictable way. In some cases the error can be large enough so that the resonant wavelength extends all the way to the next higher-order resonance of a ring resonator, or more than one free spectral range (FSR) away from the target value.

This unpredictable shift in the resonant wavelength of the ring resonators can make WDM applications difficult because the resonant wavelengths are expected to fall within and on a uniform grid of wavelengths (which is sometimes referred to as an 'International Telecommunication Union grid' or 'ITU grid'). Typically, ITU grids vary between 0.8 and 10 nm in wavelength spacing for dense WDM to coarse WDM applications. Thus, the manufacturing variations in ring resonators can make it difficult to align resonant wavelengths in different components (such as multiplexer and de-multiplexer ring-resonator filters) and/or with the carrier wavelengths output by a set of optical sources.

In principle, ring resonators can be tuned so that their resonant wavelengths match their target values. However, in practice, such tuning can significantly increase power consumption. Indeed, the tuning power for ring resonators can be larger than those of any other power component in a silicon-photonic link (including the power used to modulate and detect the light), and can even exceed optical losses associated with propagation of the light in silicon optical waveguides. Moreover, the increased power consumption can result in increased temperatures in chips with high interconnect density, and thus may present challenges for existing thermal-management techniques.

Hence, what is needed is an integrated ring resonator without the above-described problems.

SUMMARY

One embodiment of the present disclosure provides an integrated circuit that includes: a substrate; a buried-oxide layer disposed on the substrate; and a semiconductor layer, disposed on the buried-oxide layer, which includes a ring resonator having a resonance wavelength, where the ring resonator includes a bus optical waveguide optically coupled to a ring-resonator optical waveguide. Moreover, the integrated circuit includes: a ferroelectric layer, having an inner end and an outer end along a radial direction of the ring-resonator optical waveguide, disposed on the ring-resonator optical waveguide; an inner electrical contact disposed above the semiconductor layer and inside of the inner end along the radial direction, where the inner electrical contact is electrically coupled to the ferroelectric layer; and an outer electrical contact disposed above the semiconductor layer and outside of the outer end along the radial direction, where the outer electrical contact is electrically coupled to the ferroelectric layer. During operation of the integrated circuit, the inner electrical contact and the outer electrical contact generate an electrical field in a plane of the ferroelectric layer approximately parallel to a top surface of the ring-resonator optical waveguide to electro-optically tune the resonance wavelength.

In some embodiments, the ring-resonator optical waveguide includes a rib optical waveguide fabricated by partially etching through a thickness of the semiconductor layer.

Furthermore, the integrated circuit may include an oxide layer disposed on the semiconductor layer outside of the ring-resonator optical waveguide, where the top surface of the ring-resonator optical waveguide and a top surface of the oxide layer are approximately coplanar. For example, the oxide layer may include silicon dioxide.

Additionally, the integrated circuit may include: a first amorphous semiconductor material disposed above the semiconductor layer between the inner contact and the inner end, where the first amorphous semiconductor material electrically couples the inner contact and the ferroelectric layer; and a second amorphous semiconductor material disposed above the semiconductor layer between the outer contact and the outer end, where the second amorphous semiconductor material electrically couples the outer contact and the ferroelectric layer. For example, the first amorphous semiconductor material and the second amorphous semiconductor material may include: p-type amorphous silicon and n-type amorphous silicon.

Note that the substrate includes silicon, the buried-oxide layer includes silicon dioxide and the semiconductor layer includes silicon. Consequently, the substrate, the buried-oxide layer and the semiconductor layer may comprise a silicon-on-insulator technology.

Moreover, the ferroelectric layer may have a dielectric constant less than that of barium strontium titanate. Furthermore, the ferroelectric layer may have a linear electro-optic coefficient that is significantly less than that of barium strontium titanate and a quadratic electro-optic coefficient that is greater than that of barium strontium titanate. For example, the ferroelectric layer may include lead lanthanum zirconium titanate and/or lead magnesium niobate-lead titanate. Additionally, the ferroelectric layer may be polycrystalline.

In some embodiments, the integrated circuit includes a voltage source, electrically coupled to the inner electrical contact and the outer electrical contact, which applies a reverse-bias voltage to the inner electrical contact and the outer electrical contact to generate the electric field.

Another embodiment provides a system that includes: a processor; a memory coupled to the processor; and the integrated circuit.

Another embodiment provides a method for tuning the resonance wavelength of the ring resonator in the integrated circuit. During operation, the integrated circuit measures the resonance wavelength of the ring resonator. Then, the integrated circuit modifies the resonance wavelength of the ring resonator by applying a voltage across the ferroelectric layer disposed on top of the ring-resonator optical waveguide in the ring resonator. This voltage is based on the measured resonance wavelength and a target resonance wavelength. Moreover, the voltage generates the electric field in the plane of the ferroelectric layer approximately parallel to the top surface of the ring-resonator optical waveguide to electro-optically tune the resonance wavelength.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an integrated circuit, a system that includes the integrated circuit, and a method for tuning a resonance wavelength of a ring resonator are described. This integrated circuit includes a ferroelectric layer (such as lead lanthanum zirconium titanate and/or lead magnesium niobate-lead titanate) disposed on top of the ring resonator, which has a resonance wavelength. The ferroelectric layer is positioned between electrical contacts. Moreover, there may be amorphous semiconductor materials between the electrical contacts and the ferroelectric layer. For example, the amorphous semiconductor materials may include: p-type amorphous silicon and/or n-type amorphous silicon. By applying a reverse-bias voltage across the electrical contacts, an electric field is generated in a plane approximately parallel to a top surface of the ring resonator. This electric field electro-optically tunes the resonance wavelength.

The ring resonator in the integrated circuit may operate at low voltage and can be integrated with a silicon optical waveguide on a silicon-on-insulator (SOI) platform. Moreover, the ring resonator may be compatible with CMOS fabrication techniques, including the next-generation drive voltages offered by 40 and 22 nm process nodes. Consequently, the integrated circuit may facilitate silicon-photonic links for use in applications such as: inter-chip optical interconnects, intra-chip optical interconnects, and/or wavelength-division multiplexing.

Figure 1:
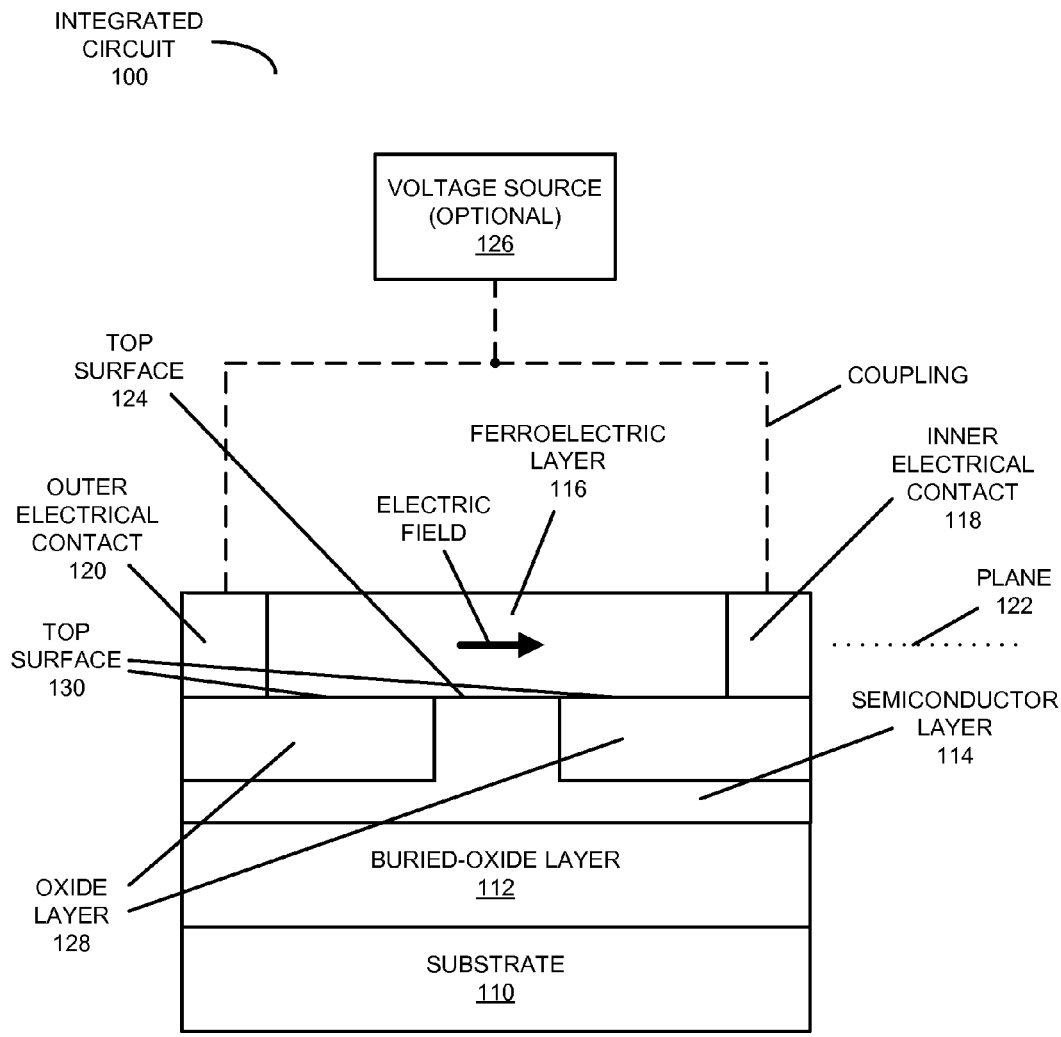
FIG. 1 is a block diagram illustrating a side view of an integrated circuit that includes an optical device in accordance with an embodiment of the present disclosure.

We now describe embodiments of the integrated circuit. FIG. 1 presents a block diagram illustrating a side view of an integrated circuit 100 that includes an optical device (such as ring resonator 210 in FIG. 2 having a resonance wavelength). This integrated circuit includes: a substrate 110; a buried-oxide layer 112 disposed on substrate 110; and a semiconductor layer 114, disposed on buried-oxide layer 112, which includes the ring resonator. In particular, substrate 110 may include silicon, buried-oxide layer 112 may include silicon dioxide and semiconductor layer 114 may include silicon. Thus, substrate 110, buried-oxide layer 112 and semiconductor layer 114 may comprise a silicon-on-insulator (SOI) technology.

Figure 2:
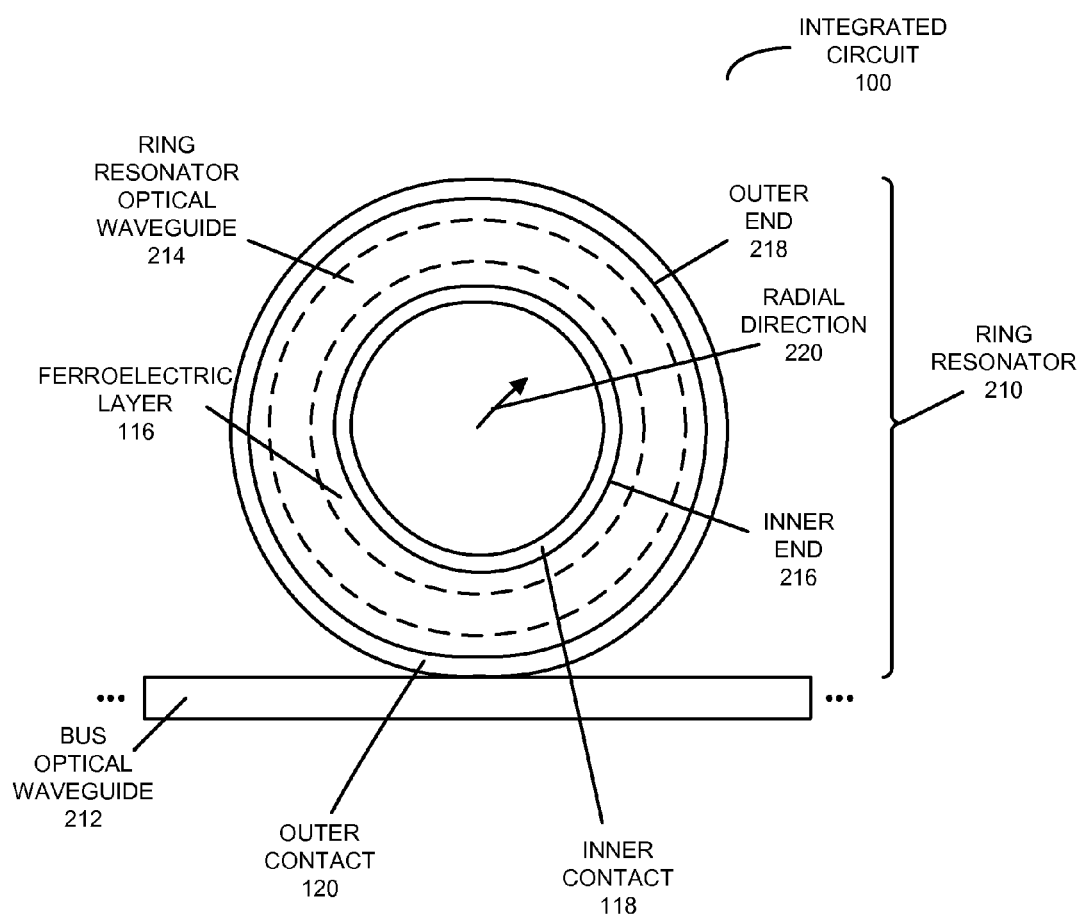
FIG. 2 is a block diagram illustrating a top view of the integrated circuit of FIG. 1 in accordance with an embodiment of the present disclosure.

As shown in FIG. 2, which presents a top view of integrated circuit 100, ring resonator 210 may include a bus optical waveguide 212 optically coupled to a ring-resonator optical waveguide 214, and which during operation of integrated circuit 100 conveys an optical signal having at least a carrier wavelength. This ring-resonator optical waveguide may include a rib optical waveguide fabricated by partially etching through a thickness of semiconductor layer 114 (FIG. 1). The use of a rib optical-waveguide architecture results in single-mode optical guiding. In addition, as described further below, the rib-optical-waveguide architecture may also facilitate ohmic contacts.

Moreover, integrated circuit 100 may include a ferroelectric layer 116, having an inner end 216 and an outer end 218 along a radial direction 220 of ring-resonator optical waveguide 214, disposed on ring-resonator optical waveguide 214. Furthermore, an inner electrical contact 118 may be disposed above semiconductor layer 114 and inside of inner end 216 along radial direction 220, where inner electrical contact 118 is electrically coupled to ferroelectric layer 116. Additionally, integrated circuit 100 may include an outer electrical contact 120 disposed above semiconductor layer 114 and outside of outer end 218 along radial direction 220, where outer electrical contact 120 is electrically coupled to ferroelectric layer 116.

In some embodiments, integrated circuit 100 includes an oxide layer 128 (FIG. 1) disposed on semiconductor layer 114 (FIG. 1) outside of ring-resonator optical waveguide 214. For example, oxide layer 128 may include silicon dioxide. This oxide layer may passivate the walls of ring-resonator optical waveguide 214 and may improve the optical confinement in the optical waveguides in integrated circuit 100. In addition, a top surface 124 (FIG. 1) of ring-resonator optical waveguide 214 may be planarized (such as with chemical mechanical polishing) so that a top surface 130 (FIG. 1) of oxide layer 128 (FIG. 1) and top surface 124 (FIG. 1) are approximately coplanar. This may facilitate deposition of ferroelectric layer 116. Note that, in some embodiments, an optional seed layer (not shown), such as silicon nitride, is deposited below ferroelectric layer 116.

Referring back to FIG. 1, during operation of integrated circuit 100, inner electrical contact 118 and outer electrical contact 120 may generate an electrical field in a plane 122 of ferroelectric layer 116 approximately parallel to top surface 124 to electro-optically tune the resonance wavelength. In particular, integrated circuit 100 may include an optional voltage source 126, electrically coupled to inner electrical contact 118 and outer electrical contact 120, which applies a voltage to inner electrical contact 118 and outer electrical contact 120 to generate the electric field. (However, in some embodiments an external voltage source may apply the voltage across inner electrical contact 118 and outer electrical contact 120.) While the optical mode is only adiabatically coupled to ferroelectric layer 116 (90% of the optical mode may be confined to ring-resonator optical waveguide 214 in FIG. 2), this coupling may be sufficient to allow ferroelectric layer 116 to shift the resonance wavelength of ring resonator 210 (FIG. 2).

Note that ferroelectric layer 116 may have a dielectric constant less than that of barium strontium titanate. This is because a high dielectric constant may include a change in silicon, which can induce optical loss and may counter the phase shift associated with ferroelectric layer 116. Furthermore, ferroelectric layer 116 may have a linear electro-optic coefficient that is significantly less than that of barium strontium titanate (such as the linear electro-optic coefficient of zero) and a quadratic electro-optic coefficient that is greater than that of barium strontium titanate. This large quadratic electro-optic coefficient may facilitate efficient (i.e., low voltage and/or low power) tuning of ring resonator 210 (FIG. 2). For example, ferroelectric layer 116 may include lead lanthanum zirconium titanate and/or lead magnesium niobate-lead titanate (which may or may not have a stoichiometric composition). In an exemplary embodiment, ferroelectric layer 116 is $Pb_{1-x}La_x(Zr_yTi_{1-y})_{1-0.25x}O_3$ or $Pb(Mg_{1/3}Nb_{2/3})O_3$—$PbTiO_3$. However, these chemical formulas are merely illustrations, and a wide variety of ferroelectric materials may be used.

Additionally, ferroelectric layer 116 may be polycrystalline. This may be useful because otherwise the orientation of the electro-optic coefficient of ferroelectric layer 116 may vary around ring-resonator optical waveguide 214 (FIG. 2). Thus, the use of a polycrystalline ferroelectric layer 116 may ensure that the optical properties are isotropic.

In an exemplary embodiment, ring resonator 210 (FIG. 2) has a tuning voltage of 12, which results in a shift in the resonance wavelength of approximately 10 nm for a quadratic electro-optic coefficient of $10^{-15}$ $m^2/V^2$. The power consumption during the tuning is low (near zero), because ferroelectric layer 116 may be an insulator. Note that ferroelectric materials of metal oxides can be integrated into a silicon platform. Consequently, ferroelectric layer 116 may be fully integrated in a CMOS-compliant process.

Figure 3:
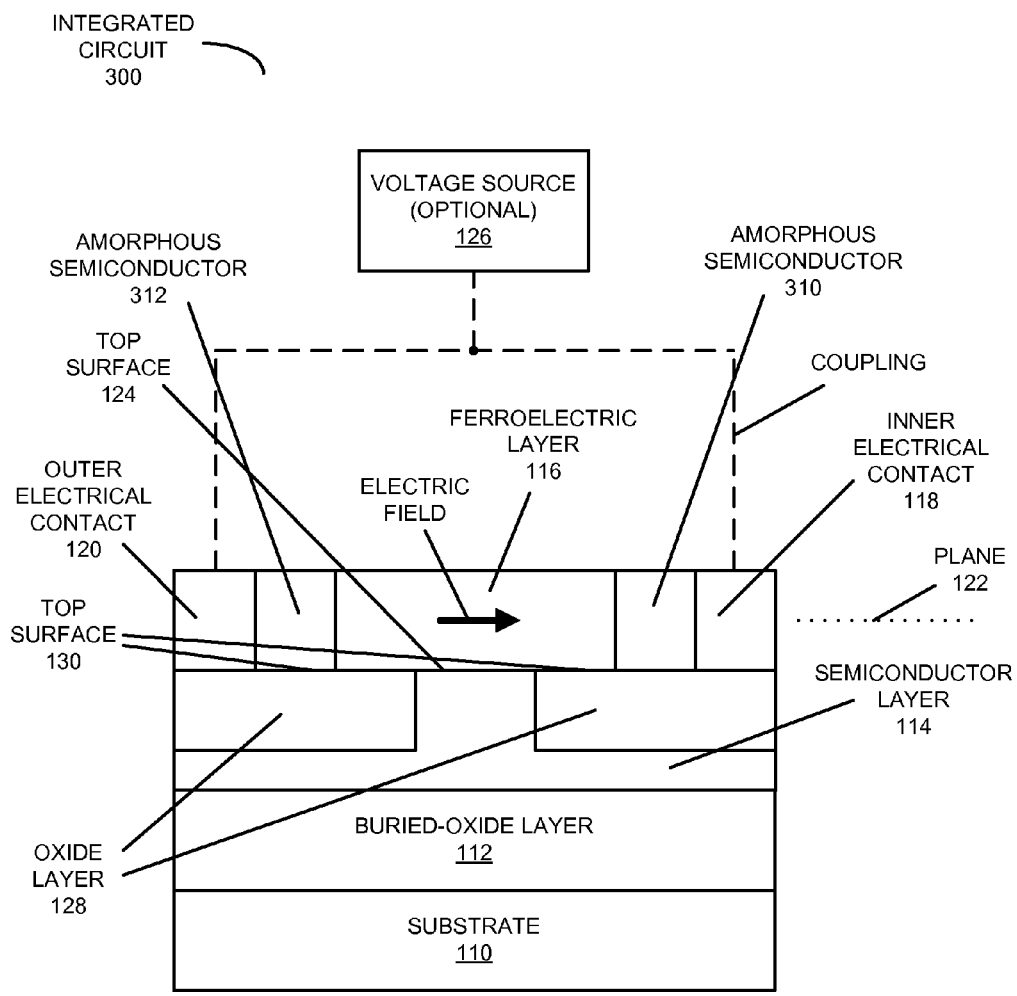
FIG. 3 is a block diagram illustrating a side view of an integrated circuit that includes an optical device in accordance with an embodiment of the present disclosure.

The tuning voltage of the ring resonator may be reduced using the configuration shown in FIG. 3, which presents a block diagram illustrating a side view of an integrated circuit 300 that includes an optical device. This integrated circuit may include: amorphous semiconductor material 310 disposed above semiconductor layer 114 between inner contact 118 and inner end 216 (FIG. 2), where amorphous semiconductor material 310 electrically couples inner contact 118 and ferroelectric layer 116; and amorphous semiconductor material 312 disposed above semiconductor layer 114 between outer contact 120 and outer end 218 (FIG. 2), where amorphous semiconductor material 312 electrically couples outer contact 120 and ferroelectric layer 116. For example, amorphous semiconductor material 310 and amorphous semiconductor material 312 may include: p-type amorphous silicon and/or n-type amorphous silicon. Thus, amorphous semiconductor material 310 and amorphous semiconductor material 312 may both be p-type amorphous silicon, amorphous semiconductor material 310 and amorphous semiconductor material 312 may both be n-type amorphous silicon, amorphous semiconductor material 310 may be p-type amorphous silicon and amorphous semiconductor material 312 may be n-type amorphous silicon, or amorphous semiconductor material 310 may be n-type amorphous silicon and amorphous semiconductor material 312 may be p-type amorphous silicon. Note that amorphous semiconductor materials 310 and 312 may be positioned radially away from ring-resonator optical waveguide 214 (FIG. 2) to avoid free-carrier-absorption loss. For example, ferroelectric layer 116 may have a width of 600 nm in plane 122. In some embodiments, the doping of amorphous semiconductor materials 310 and 312 is between $10^{18}$ and $10^{19}/cm^3$.

The use of amorphous semiconductor materials 310 and 312 may enhance the electrical field of ferroelectric layer 116 and, thus, may reduce the tuning voltage. For example, a tuning voltage of approximately 5 V (such as 3.7 V) may result in a shift in the resonance wavelength of approximately 10 nm for a quadratic electro-optic coefficient of $10^{-15}$ $m^2/V^2$. Moreover, the voltage may reverse-bias the p-i-n diode junctions formed between amorphous semiconductor materials 310 and 312 and ferroelectric layer 116, so there is no direct current flow, the response is fast, and the tuning may consume little to no dissipative power. For example, the n-type amorphous silicon may be held at ground and a positive voltage may be applied to the p-type amorphous silicon.

Furthermore, the optical waveguides in the integrated circuit may convey an optical signal having one or more wavelengths between 1.1-1.7 µm, such as an optical signal having a fundamental wavelength of 1.3 or 1.55 µm. Moreover, semiconductor layer 114 may have a thickness that is less than 1 µm (such as 0.25-0.3 µm). Furthermore, buried-oxide layer 112 may have a thickness between 0.3 and 3 µm (such as 0.8 µm). For example, if semiconductor layer 114 (FIG. 1) has a thickness of 300 nm, ring-resonator optical waveguide 214 (FIG. 2) may be etched 220 nm deep with a width of 350 nm. In addition, ferroelectric layer 116 may have a thickness of 200 nm. However, these thicknesses and widths are only for purposes of illustration, and a wide variety of geometries may be used.

Figure 4:
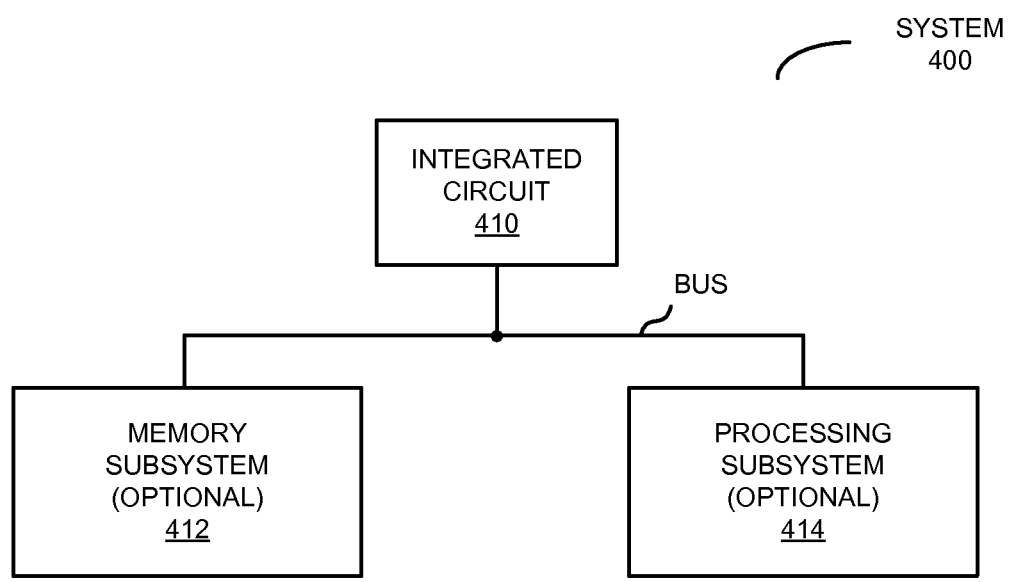
FIG. 4 is a block diagram illustrating a system that includes the integrated circuit of FIG. 1 in accordance with an embodiment of the present disclosure.

The integrated circuit may be used in a variety of applications. This is shown in FIG. 4, which presents a block diagram illustrating a system 400 that includes integrated circuit 410, which may include one of the embodiments of the integrated circuit shown in FIGS. 1-3.

In general, functions of the integrated circuit and system 400 may be implemented in hardware and/or in software. Thus, system 400 may include one or more program modules or sets of instructions stored in an optional memory subsystem 412 (such as DRAM or another type of volatile or non-volatile computer-readable memory), which may be executed by an optional processing subsystem 414. Note that the one or more computer programs may constitute a computer-program mechanism. Furthermore, instructions in the various modules in optional memory subsystem 412 may be implemented in: a high-level procedural language, an object-oriented programming language, and/or in an assembly or machine language. Note that the programming language may be compiled or interpreted, e.g., configurable or configured, to be executed by the processing subsystem.

Components in system 400 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 400 may be at one location or may be distributed over multiple, geographically dispersed locations.

System 400 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Note that a given computer system may be at one location or may be distributed over multiple, geographically dispersed locations.

Moreover, the integrated circuit can be used in a wide variety of applications, such as: optical communications (for example, in an optical interconnect or an optical link), data storage (such as an optical-storage device or system), medicine (such as a diagnostic technique or surgery), a barcode scanner, and/or metrology (such as precision measurements of distance).

Furthermore, the embodiments of the optical device, the integrated circuit and/or the system may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the optical device, the integrated circuit and/or the system may be implemented more in hardware and less in software, or less in hardware and more in software, as is known in the art.

While the preceding embodiments have been illustrated with particular elements and compounds, a wide variety of materials and compositions (including stoichiometric and non-stoichiometric compositions) may be used, as is known to one of skill in the art. Thus, while a silicon optical waveguide was illustrated in the preceding embodiments, the modulation technique may be used with other materials, as is known to one of skill in the art. Furthermore, these materials and compounds may be fabricated using a wide variety of processing techniques, including: evaporation, sputtering, molecular-beam epitaxy, wet or dry etching (such as photolithography or direct-write lithography), polishing, etc.

Figure 5:
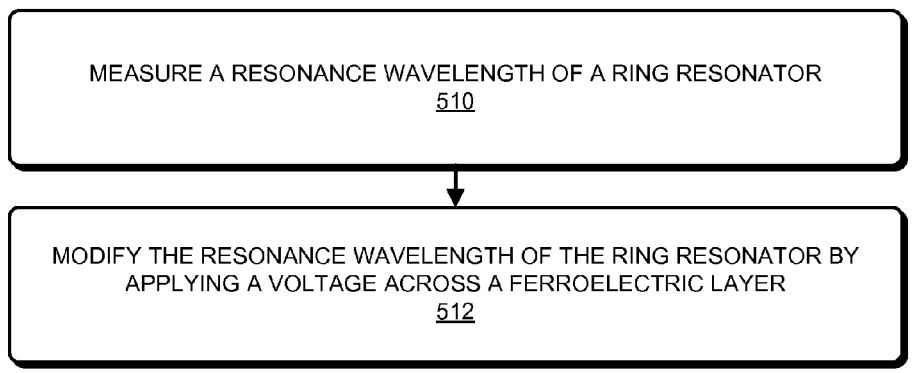
FIG. 5 is a flow chart illustrating a method for tuning a resonance wavelength of a ring resonator in the integrated circuit of FIG. 1 in accordance with an embodiment of the present disclosure.

We now describe embodiments of the method. FIG. 5 presents a flow chart illustrating a method 500 for tuning a resonance wavelength of a ring resonator in an integrated circuit, which may be performed by one of the embodiments of the integrated circuit in FIGS. 1-3. During operation, the integrated circuit measures the resonance wavelength of the ring resonator (operation 510). Then, the integrated circuit modifies the resonance wavelength of the ring resonator by applying a voltage across a ferroelectric layer (operation 512) disposed on top of a ring-resonator optical waveguide in the ring resonator. This voltage is based on the measured resonance wavelength and a target resonance wavelength (such as the carrier wavelength of the optical signal conveyed by bus optical waveguide 212 in FIG. 2). Moreover, the voltage generates an electric field in a plane of the ferroelectric layer approximately parallel to the top surface of the ring-resonator optical waveguide to electro-optically tune the resonance wavelength.

In some embodiments of method 500, there are additional or fewer operations. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
a substrate;
a buried-oxide layer disposed on the substrate;
a semiconductor layer, disposed on the buried-oxide layer, that includes a ring resonator having a resonance wavelength, wherein the ring resonator includes a bus optical waveguide optically coupled to a ring-resonator optical waveguide;
a ferroelectric layer, having an inner end and an outer end along a radial direction of the ring-resonator optical waveguide, disposed on the ring-resonator optical waveguide;
an inner electrical contact disposed above the semiconductor layer and inside of the inner end along the radial direction, wherein the inner electrical contact is electrically coupled to the ferroelectric layer; and
an outer electrical contact disposed above the semiconductor layer and outside of the outer end along the radial direction, wherein the outer electrical contact is electrically coupled to the ferroelectric layer; and
wherein the inner electrical contact and the outer electrical contact are configured to generate an electrical field in a plane of the ferroelectric layer approximately parallel to a top surface of the ring-resonator optical waveguide to electro-optically tune the resonance wavelength.

2. The integrated circuit of claim 1, wherein the ring-resonator optical waveguide includes a rib optical waveguide fabricated by partially etching through a thickness of the semiconductor layer.

3. The integrated circuit of claim 1, wherein the integrated circuit further comprises an oxide layer disposed on the semiconductor layer outside of the ring-resonator optical waveguide; and
wherein the top surface of the ring-resonator optical waveguide and a top surface of the oxide layer are approximately coplanar.

4. The integrated circuit of claim 3, wherein the oxide layer includes silicon dioxide.

5. The integrated circuit of claim 1, wherein the integrated circuit further comprises:
a first amorphous semiconductor material disposed above the semiconductor layer between the inner contact and the inner end, wherein the first amorphous semiconductor material electrically couples the inner contact and the ferroelectric layer; and
a second amorphous semiconductor material disposed above the semiconductor layer between the outer contact and the outer end, wherein the second amorphous semiconductor material electrically couples the outer contact and the ferroelectric layer.

6. The integrated circuit of claim 5, wherein the first amorphous semiconductor material and the second amorphous semiconductor material include one of: p-type amorphous silicon and n-type amorphous silicon.

7. The integrated circuit of claim 1, wherein the substrate includes silicon, the buried-oxide layer includes silicon dioxide and the semiconductor layer includes silicon.

8. The integrated circuit of claim 1, wherein the substrate, the buried-oxide layer and the semiconductor layer comprise a silicon-on-insulator technology.

9. The integrated circuit of claim 1, wherein the ferroelectric layer includes one of: lead lanthanum zirconium titanate and lead magnesium niobate-lead titanate.

10. The integrated circuit of claim 1, wherein the ferroelectric layer is polycrystalline.

11. The integrated circuit of claim 1, wherein the integrated circuit further comprises a voltage source, electrically coupled to the inner electrical contact and the outer electrical contact, configured to apply a reverse-bias voltage to the inner electrical contact and the outer electrical contact to generate the electric field.

12. A system, comprising:
a processor;
a memory coupled to the processor; and
an integrated circuit, wherein the integrated circuit includes:
a substrate;
a buried-oxide layer disposed on the substrate;
a semiconductor layer, disposed on the buried-oxide layer, that includes a ring resonator having a resonance wavelength, wherein the ring resonator includes a bus optical waveguide optically coupled to a ring-resonator optical waveguide;
a ferroelectric layer, having an inner end and an outer end along a radial direction of the ring-resonator optical waveguide, disposed on the ring-resonator optical waveguide;
an inner electrical contact disposed above the semiconductor layer and inside of the inner end along the radial direction, wherein the inner electrical contact is electrically coupled to the ferroelectric layer; and
an outer electrical contact disposed above the semiconductor layer and outside of the outer end along the radial direction, wherein the outer electrical contact is electrically coupled to the ferroelectric layer; and
wherein the inner electrical contact and the outer electrical contact are configured to generate an electrical field in a plane of the ferroelectric layer approximately parallel to a top surface of the ring-resonator optical waveguide to electro-optically tune the resonance wavelength.

13. The system of claim 12, wherein the ring-resonator optical waveguide includes a rib optical waveguide fabricated by partially etching through a thickness of the semiconductor layer; and
wherein the integrated circuit further includes an oxide layer disposed on the semiconductor layer outside of the ring-resonator optical waveguide; and
wherein the top surface of the ring-resonator optical waveguide and a top surface of the oxide layer are approximately coplanar.

14. The system of claim 12, wherein the integrated circuit further includes:
a first amorphous semiconductor material disposed above the semiconductor layer between the inner contact and the inner end, wherein the first amorphous semiconductor material electrically couples the inner contact and the ferroelectric layer; and
a second amorphous semiconductor material disposed above the semiconductor layer between the outer contact and the outer end, wherein the second amorphous semiconductor material electrically couples the outer contact and the ferroelectric layer.

15. The system of claim 14, wherein the first amorphous semiconductor material and the second amorphous semiconductor material include one of: p-type amorphous silicon and n-type amorphous silicon.

16. The system of claim 12, wherein the ferroelectric layer has a linear electro-optic coefficient that is significantly less than that of barium strontium titanate and a quadratic electro-optic coefficient that is greater than that of barium strontium titanate.

17. The system of claim 12, wherein the ferroelectric layer includes one of: lead lanthanum zirconium titanate and lead magnesium niobate-lead titanate.

18. A method for tuning the resonance wavelength of a ring resonator, comprising:
   measuring a resonance wavelength of a ring resonator in an integrated circuit; and
   modifying the resonance wavelength of the ring resonator by applying a voltage across a ferroelectric layer disposed on top of a ring-resonator optical waveguide in the ring resonator, wherein the voltage is based on the measured resonance wavelength and a target resonance wavelength; and
   wherein the voltage generates an electric field in a plane of the ferroelectric layer approximately parallel to a top surface of the ring-resonator optical waveguide to electro-optically tune the resonance wavelength.

\* \* \* \* \*